United States Patent
Keleher

(10) Patent No.: US 9,156,610 B2
(45) Date of Patent: Oct. 13, 2015

(54) DUNNAGE PRODUCT

(75) Inventor: John Keleher, Granger, IN (US)

(73) Assignee: AM General LLC, South Bend, IN (US)

( * ) Notice: Subject to any disclaimer, the term of this patent is extended or adjusted under 35 U.S.C. 154(b) by 1092 days.

(21) Appl. No.: 13/091,439

(22) Filed: Apr. 21, 2011

(65) Prior Publication Data

US 2012/0266572 A1  Oct. 25, 2012

(51) Int. Cl.
| | |
|---|---|
| *B65B 23/00* | (2006.01) |
| *B65B 55/00* | (2006.01) |
| *B65B 55/20* | (2006.01) |
| *B65D 81/02* | (2006.01) |
| *B65D 90/00* | (2006.01) |

(52) U.S. Cl.
CPC ............ *B65D 90/0053* (2013.01); *B65B 23/00* (2013.01); *B65D 90/0046* (2013.01); *B65D 2590/005* (2013.01); *Y02W 30/807* (2015.05)

(58) Field of Classification Search
CPC ........ B65B 55/20; B65B 61/22; B65B 23/22; B65B 5/105; E05B 79/12; B65D 21/0215; B65D 5/58
USPC ........ 53/472, 115, 139.5, 475, 474, 403, 453, 53/79, 558, 562, 568; 403/196, 373; 206/512, 521, 494, 554; 493/196, 373, 493/967
See application file for complete search history.

(56) References Cited

U.S. PATENT DOCUMENTS

| | | | |
|---|---|---|---|
| 2,059,390 A | 11/1936 | Pagel | |
| 2,610,134 A * | 9/1952 | Hoblick | ......................... 156/213 |
| 2,662,649 A | 12/1953 | Gill et al. | |
| 2,991,089 A | 7/1961 | Stuart et al. | |
| 3,021,970 A | 2/1962 | Bigge et al. | |
| 3,263,830 A | 8/1966 | Anderson | |
| 3,373,540 A | 3/1968 | Wisner | |
| 3,389,534 A * | 6/1968 | Pendleton | ........................ 53/550 |
| 4,921,101 A * | 5/1990 | Gatt | ............................... 206/451 |
| 5,178,279 A * | 1/1993 | Carroll | .......................... 206/499 |
| 5,267,652 A * | 12/1993 | Carroll | .......................... 206/589 |
| 5,294,222 A | 3/1994 | Smith | |
| 5,306,100 A | 4/1994 | Higginbotham | |
| 5,339,958 A * | 8/1994 | Taravella et al. | .............. 206/521 |
| 5,996,798 A * | 12/1999 | Gessert | ......................... 206/521 |
| 6,041,933 A * | 3/2000 | Baker | ........................... 206/564 |
| 6,128,889 A * | 10/2000 | Fuss | ................................ 53/472 |
| 6,591,580 B1 * | 7/2003 | Tharpe, Jr. | .................... 53/139.5 |
| 6,718,729 B2 * | 4/2004 | Manley | ............................ 53/247 |
| 6,793,853 B2 * | 9/2004 | Carroll | ......................... 264/40.1 |
| 7,029,259 B2 * | 4/2006 | Carroll | .......................... 425/142 |
| 7,186,066 B2 | 3/2007 | Bohac et al. | |
| 7,254,932 B2 * | 8/2007 | Tanaka et al. | .................... 53/472 |
| 7,322,479 B2 * | 1/2008 | Kaltz et al. | ...................... 206/589 |
| 7,464,517 B2 * | 12/2008 | Akatsuka et al. | ............... 53/433 |
| 7,469,786 B1 * | 12/2008 | Rowley et al. | ................. 206/521 |
| 7,665,275 B2 * | 2/2010 | Meessen | .......................... 53/247 |
| 7,849,664 B2 * | 12/2010 | Corbett et al. | ................. 53/472 |
| 7,866,125 B2 * | 1/2011 | Simmons et al. | ............... 53/472 |
| 8,234,844 B2 * | 8/2012 | Davlin et al. | .................... 53/456 |

(Continued)

*Primary Examiner* — Stephen F Gerrity
*Assistant Examiner* — Eyamindae Jallow
(74) *Attorney, Agent, or Firm* — Barnes & Thornburg LLP

(57) ABSTRACT

An apparatus and method for packing products includes a dunnage product. The dunnage product includes a bracket engageable with a shipping container, a shaft connected to the bracket, and a number of elongated flexible members movable along the shaft. The elongated flexible members can be placed between the manufactured products during the packing process. The dunnage product is preferably reusable.

28 Claims, 4 Drawing Sheets

(56) References Cited

U.S. PATENT DOCUMENTS

| | | | |
|---|---|---|---|
| 2001/0000275 A1* | 4/2001 | Weder | 53/484 |
| 2003/0080019 A1* | 5/2003 | Tsaur | 206/521 |
| 2005/0126952 A1* | 6/2005 | Kaltz et al. | 206/592 |
| 2008/0098699 A1* | 5/2008 | Cheich et al. | 53/472 |
| 2008/0307756 A1* | 12/2008 | Meessen | 53/473 |
| 2009/0064638 A1* | 3/2009 | Corbett et al. | 53/472 |
| 2009/0082187 A1* | 3/2009 | Cheich et al. | 493/350 |
| 2009/0277139 A1* | 11/2009 | Eckel | 53/474 |
| 2010/0275557 A1* | 11/2010 | Buta et al. | 53/472 |
| 2010/0293898 A1* | 11/2010 | Cheich et al. | 53/472 |
| 2013/0126383 A1* | 5/2013 | Bradford et al. | 206/521 |
| 2014/0224699 A1* | 8/2014 | Smith | 206/522 |
| 2014/0314978 A1* | 10/2014 | Lepine et al. | 428/35.2 |

* cited by examiner

DUNNAGE PRODUCT

BACKGROUND

The present invention relates generally to a method and apparatus for packaging materials in a shipping container. More specifically, the present invention relates to an apparatus and method for inserting dunnage between pieces of product or other cargo to separate them during shipment or storage.

The use of various materials as dunnage between packed items, such as manufactured products, provides protection for the items during shipping. The vibration or other movement experienced by packed items during shipping sometimes causes the items to move such that they rub against one another and cause damage. Dunnage can prevent the articles from contacting one another, thereby preventing damage.

Various materials may be used as dunnage. For example, cardboard structures may be produced and placed in shipping containers to separate the articles being shipped. An example of this type of dunnage is shown in U.S. Pat. No. 5,306,100. Bubble wrap, foam peanuts and other materials may also be used. Certain of these materials can be impractical to use in certain circumstances. For example, large boxes or crates could require a large volume of foam peanuts, especially if the box or crate is not fully packed with articles to be shipped. When the container reaches its destination, the receiving party must dispose of or store the peanuts. At some point, the shipping container can be so large that loose dunnage, such as foam peanuts, are not a realistic option. Various cardboard structures can be used in these situations. However, the receiving party still has to dispose of or store these relatively large structures. Additionally, it may be difficult to reuse these structures because they become weakened or damaged as they are repeatedly folded and unfolded.

SUMMARY

One embodiment of the present invention is a method of packing products in a shipping container. The shipping container may have a bottom and a wall extending up from the bottom. The method of packing may include using one or more dunnage products. The dunnage products may include a bracket for coupling the dunnage product to the container, a shaft connected to the bracket, and a plurality of flexible members retained on the shaft and movable therealong. The method may include positioning a first of the plurality of flexible members in the shipping container, positioning a first product on the first of the plurality of flexible members, positioning a second of the plurality of flexible members on the first product and positioning a second product on the second of the plurality of flexible members.

In some embodiments, the method may further include moving the second of the plurality of flexible members along the shaft to position the second of the plurality of flexible members in a vertically spaced relation relative to the first of the plurality of flexible members.

In some embodiments, the method may include securing the dunnage product to the container. Securing the dunnage product to the container may include clamping the dunnage product to the container. The method may include coupling the bracket of a first dunnage product to the wall of the container.

In other embodiments, the method further includes positioning a plurality of the dunnage products on the container, positioning a first of the plurality of flexible members of each of the dunnage products in the shipping container, positioning one or more products on the first of the plurality of flexible members, positioning a second of the plurality of flexible members of each of the dunnage products on the one or more products, and positioning one or more additional products on each of the second of the plurality of flexible members.

In another embodiment of the invention, the wall of the shipping container includes an upper edge, the bracket includes a channel and the method further includes placing the bracket on the wall such that the edge is located at least partially within the channel.

In another embodiment of the present invention, a dunnage product includes a bracket, a shaft connected to the bracket, a retainer connected to the shaft and one or more elongated flexible members having a first end retained on the shaft and movable along the longitudinal axis of the shaft. The flexible member may also include a free end. The bracket may be configured to be removably engaged with the wall of a shipping container. In one embodiment, the dunnage product further includes a clamp for securing the dunnage product to a shipping container. In other embodiments, the retainer is removable. The flexible member can include a length of nylon rope, a strap or other flexible portions. According to another embodiment of the present invention, the flexible member includes a body and a loop encircling the shaft. In one embodiment, the dunnage product is reusable.

Additional features of the invention will become apparent to those skilled in the art upon consideration of the following detailed description of illustrative embodiments of the invention.

DETAILED DESCRIPTION OF EMBODIMENTS OF THE INVENTION

Figure 1:
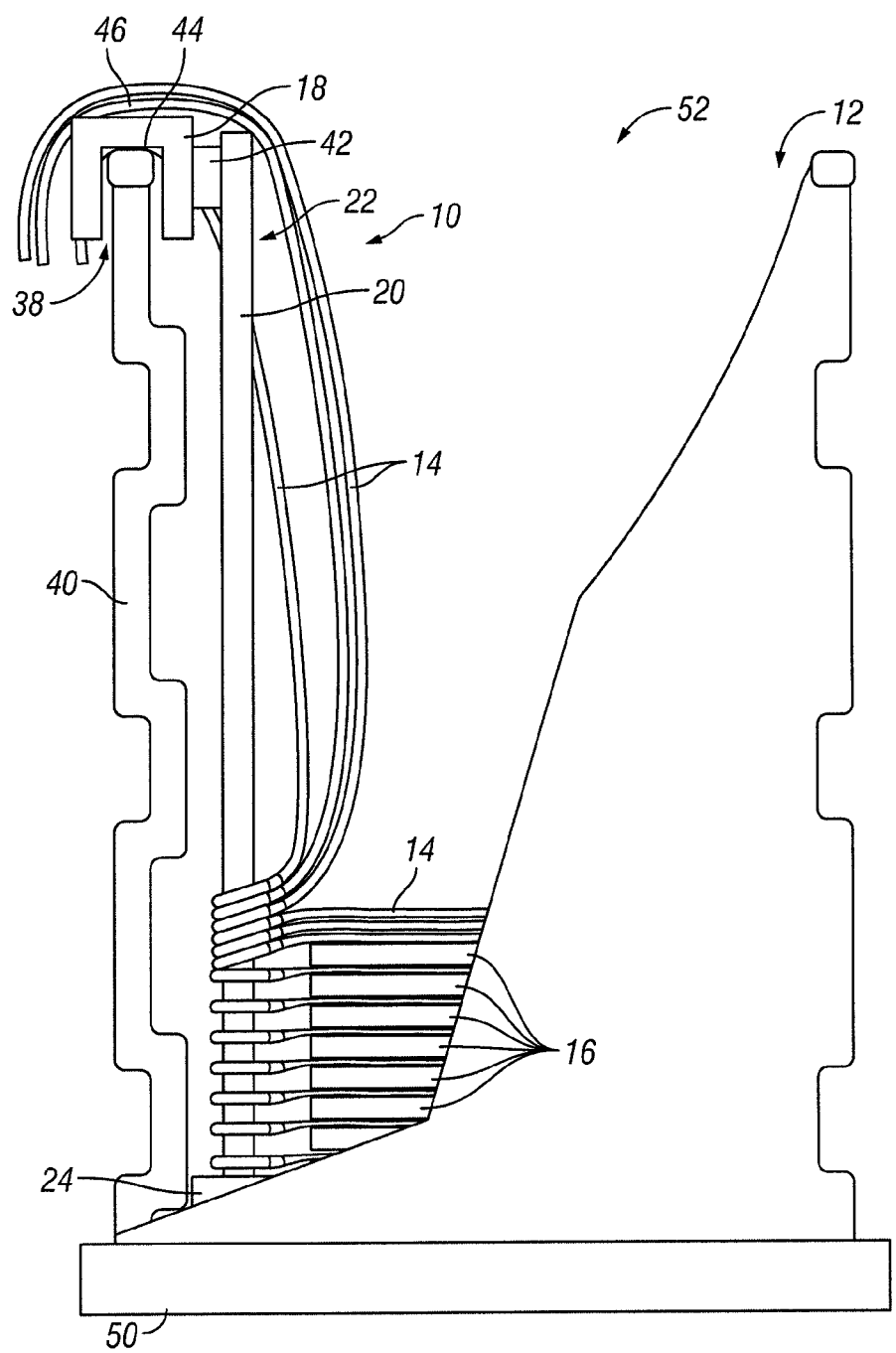
FIG. 1 is a side view of a shipping container with portions removed, the shipping container including products positioned in an interior space of the shipping container and a dunnage product according to one embodiment of the present invention.

FIG. 1 shows a dunnage product 10 according to one embodiment of the present invention positioned in a shipping container 12. A number of products 16 to be shipped have been placed in container 12. The dunnage product 10 includes a bracket 18, an elongate shaft 20 that is connected to the bracket 18 and depends therefrom and a plurality of flexible members 14. A retainer 24 is connected to the end of the shaft 20 distal to the bracket 18. The shaft 20 has a longitudinal length 26 defining a longitudinal axis 28. In the embodiment of FIGS. 1-4, the shaft 20 has a circular cross-section along the longitudinal axis 28. It should be understood that the shaft 20 may have other cross-sections that are non-circular in other embodiments. For example, the shaft 20 may have square, triangular, rectangular, hexagonal, or octagonal cross-sections, among others. Bracket 18 and shaft 20 are preferably manufactured from a durable, rigid material, such as steel, although other materials may also be used.

Figure 4:
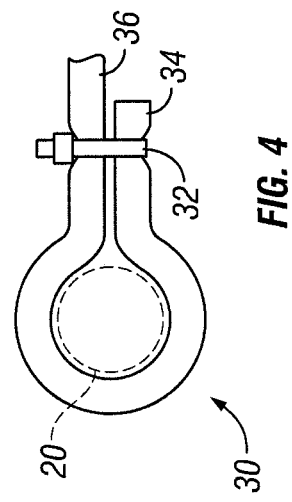
FIG. 4 is a top plan view of an end of one of the flexible members that is a portion of the dunnage product shown in FIG. 1.

Each flexible member 14 includes a loop 30 formed at one end and a body portion 36 extending from loop 30. In an illustrative embodiment, the loop 30 of a flexible member 14 is formed by folding an end 34 of the flexible member 14 back upon itself and securing the end 34 with a fastener 32 as shown in FIG. 4. In the illustrative embodiment, the fastener 32 includes a cable tie wrapped around the flexible member 14 and tightened to secure the end 34 to body 36 and form the loop 30. It should be understood that the end 34 of the flexible member 14 may be formed using any of a number of techniques. For example, the fastener 32 may comprise adhesive tape wrapped around the end 34 and body 36 of the flexible member 14. In other embodiments, other fastening devices and methods may be used. For example, the end 34 and body 36 may be joined by hot melt weld or ultrasonic welding. Other mechanical fasteners may be crimped over the end 34 and body 36 to secure the loop 30.

Loops 30 and retainer 24 are sized and configures such that retainer 24 cannot readily pass through loops 30, thereby retaining flexible members 14 on shaft 20. In some embodiments, the retainer 24 is removably connected to the shaft 20 so that flexible members 14 may be added or removed from the dunnage product 10. Furthermore, although retainer 24 is shown as a disc-shaped member, other structures can also be used as a retainer. For example, one or more rods or bars extending perpendicular to shaft 20 could be utilized to retain flexible members 14 on shaft 20. The flexible members 14 are movable along the shaft 20 to multiple vertical positions along the longitudinal axis 28.

Figure 7:
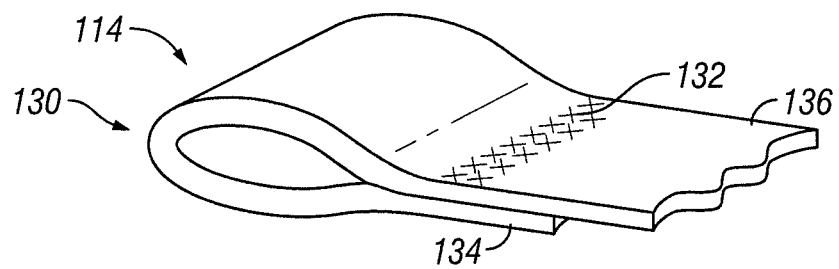
FIG. 7 is a perspective view of a portion of a dunnage product according to another embodiment of the present invention.

In the embodiment shown, flexible members 14 are 3/16 inch diameter braided nylon rope. It should be understood, however, that the flexible members 14 may be formed of other materials and have other shapes within the scope of the invention. For example, in another embodiment of the present invention shown in FIG. 7, each flexible member 114 is a nylon web material similar to a safety belt used in vehicles. Each flexible member 114 includes a loop 130 formed by folding an end 134 back on the body 136 and securing by stitching 132. In other embodiments, the flexible members 14 may take on any of a number of shapes and dimensions within the scope of this disclosure. In some embodiments, the flexible members 14 may comprise cotton. Flexible members 14 can be made from a wide variety of materials, including cotton, neoprene, nylon and other flexible materials of sufficient strength and durability to permit dunnage product 10 to perform its intended functions. Furthermore, it is not necessary that all of the flexible members 14 on shaft 20 have the same shape or that they are made from the same material.

Figure 2:
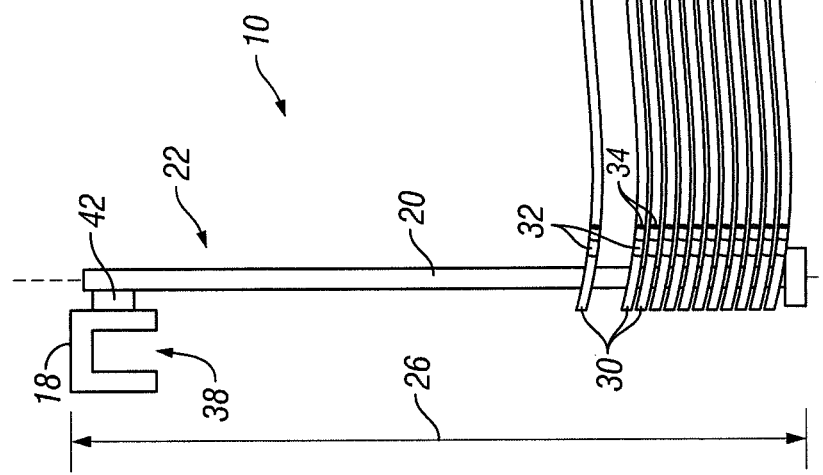
FIG. 2 is a side view of the dunnage product shown in FIG. 1.

In the embodiment shown in FIGS. 1 and 2, the bracket 18 is U-shaped and includes a channel 38 that may be positioned on a wall 40 of the shipping container 12 as shown. A spacer 42 is connected to the bracket 18 and the shaft 20. The spacer 42 positions the shaft 20 away from the wall 40 so that there is clearance between the flexible members 14 and the wall 40. In this position, the flexible members 14 are free to move along the longitudinal length of the shaft 20 when the dunnage product 10 is coupled to the shipping container 12. Brackets, spacers and/or combinations thereof having configurations other than those shown in the figures may also be utilized.

As shown in FIG. 1, the flexible members 14 may be positioned between pieces product 16 as products 16 are placed in the shipping container 12 to protect products 16 from damaging each other due to relative movement that may occur during shipping. For example, products 16 may have a surface treatment such as painting, plating, anodization, brushing (as in the case of aluminum or stainless steel) or other cosmetic surface treatment. Relative movement between the pieces of product 16 may result in scratches or other damage to the surface treatment. The flexible members 14 prevent contact between the pieces of product 16.

Figure 5:
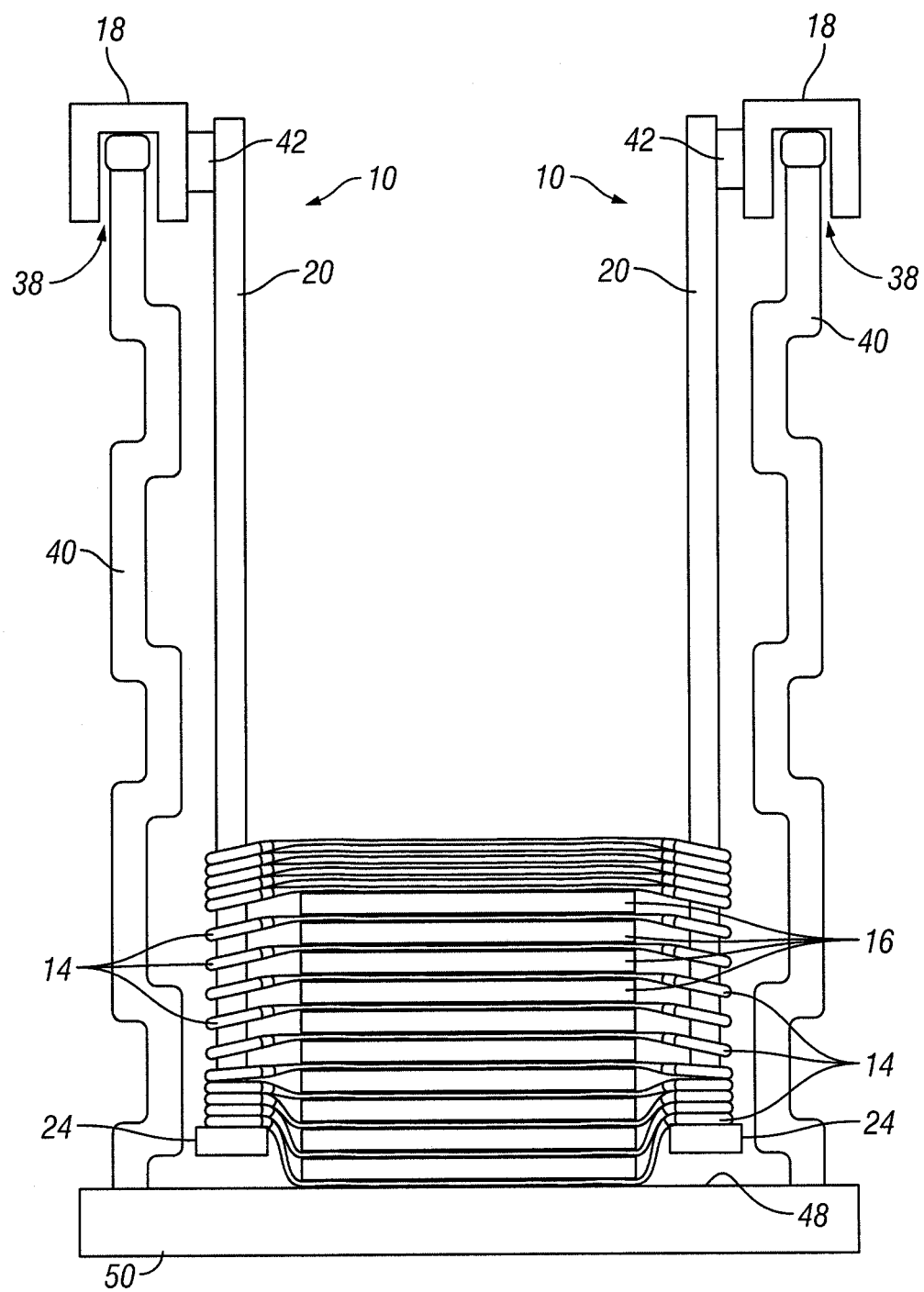
FIG. 5 is a view similar to FIG. 1 showing the shipping container and multiple dunnage products positioned on opposite walls of the shipping container.
Figure 6:
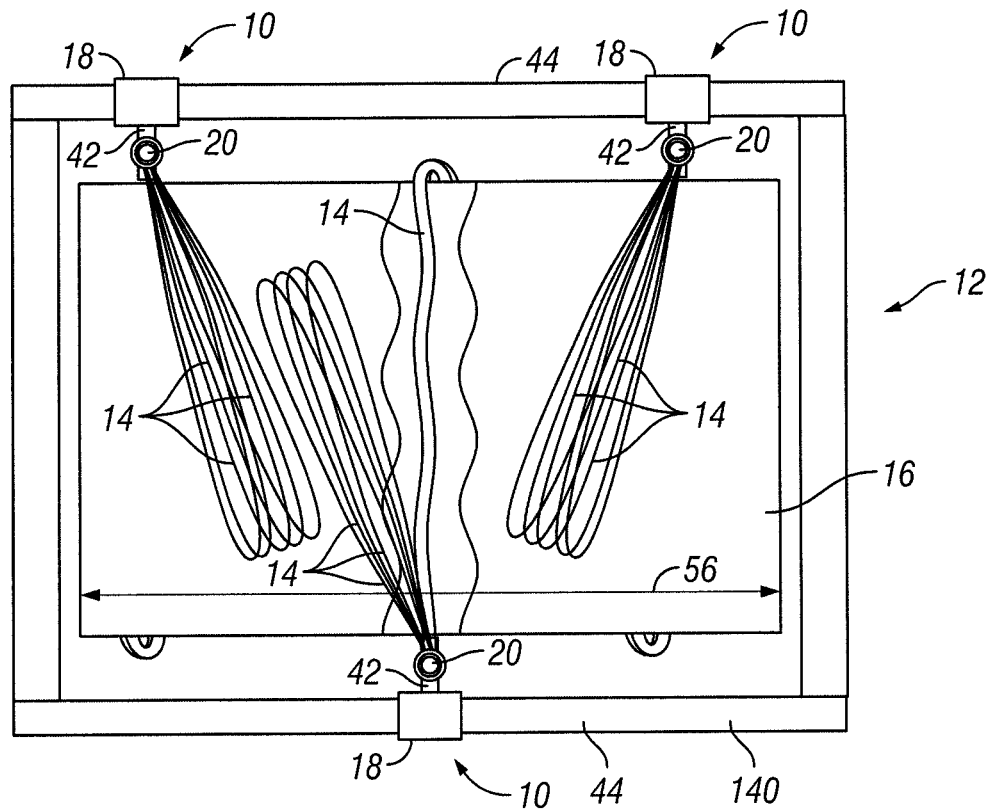
FIG. 6 is a top plan view of the shipping container of FIG. 5.

As shown in FIGS. 1, 5 and 6, in use, one or more dunnage products 10 may be positioned along the length 56 of shipping container 12 such that brackets 18 straddle upper edge 44 of the wall 40 and shafts 20 are positioned in an interior space 52 of the shipping container 12. The flexible members 14 are laid over the edge 44 as shown at 46 in FIG. 1. Beginning with the flexible members 14 nearest the retainers 24, the user positions one or more flexible members 14 from one or more dunnage products 10 on upper surface 48 of bottom 50 of the shipping container 12. One or more pieces of product 16 are then positioned on the flexible members 14. The user then positions additional flexible members 14 as desired on the products 16. This process is repeated until all of products 16 are positioned in the shipping container 12. Unused flexible members 14 are positioned on top of the products 16 inside the interior space 52 of the storage container 12 during shipping.

Figure 3:
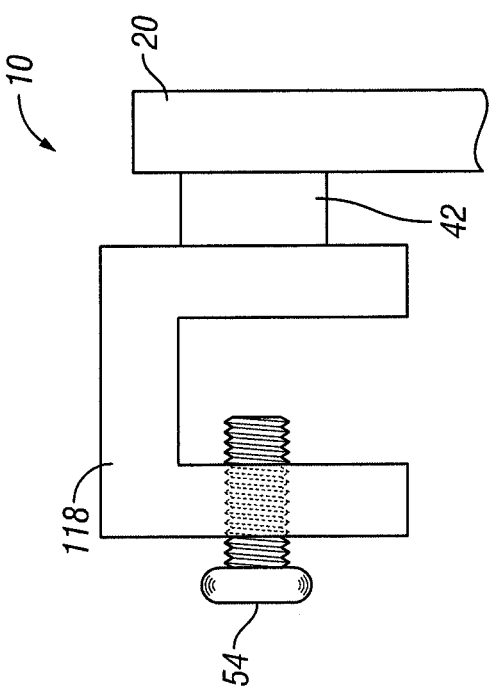
FIG. 3 is a side view of a portion of a dunnage product according to another embodiment of the present invention.

In another embodiment shown in FIG. 3, the bracket 118 includes a clamping screw 54 that is movable relative to the bracket 118 to apply a clamping force to secure the dunnage product 10 to the wall 40 of shipping container 12.

Although the invention has been described with reference to the preferred embodiments, variations and modifications exist within the scope and spirit of the invention as described and defined in the following claims.

The invention claimed is:

1. A method of packing products in a shipping container having a bottom and a wall extending up from the bottom, the wall including an upper edge, the method of packing including using a dunnage product including a bracket for coupling the dunnage product to the container, the bracket including a channel, a shaft connected to the bracket, and a plurality of flexible members retained on the shaft and movable thereal-ong, the method including:
   placing the bracket on the wall such that the edge is located at least partially within the channel,
   positioning a first of the plurality of flexible members in the shipping container,
   positioning a product on the first of the plurality of flexible members,
   positioning a second of the plurality of flexible members on the product, and
   positioning a second product on the second of the plurality of flexible members.

2. The method of claim 1, wherein the method further includes moving the second of the plurality of flexible members along the shaft to position the second of the plurality of flexible members in a vertically spaced relation relative to the first of the plurality of flexible members.

3. The method of claim 2, wherein the dunnage product is reusable.

4. The method of claim 1, wherein the method further includes securing the dunnage product to the container.

5. The method of claim 4, wherein securing the dunnage product to the container includes clamping the dunnage product to the container.

6. The method of claim 1, wherein the method further includes positioning a plurality of the dunnage products on the container.

7. The method of claim 6, wherein the method further includes
   positioning a first of the plurality of flexible members of each of the dunnage products in the shipping container,
   positioning one or more products on the first of the plurality of flexible members,
   positioning a second of the plurality of flexible members of each of the dunnage products on the one or more products, and
   positioning one or more additional products on each of the second of the plurality of flexible members.

8. A dunnage product, including:
   a bracket configured to be removably engaged with the wall of a shipping container,
   a shaft having a longitudinal axis, the shaft connected to the bracket and extending downwardly from the bracket when the bracket is engaged with the wall of the shipping container,
   a retainer connected to the shaft, and
   an elongated flexible member having a first end retained on the shaft and movable along the longitudinal axis of the shaft.

9. The dunnage product of claim 8, wherein the dunnage product further includes a clamp for securing the dunnage product to the shipping container.

10. The dunnage product of claim 8, wherein the retainer is removable.

11. The dunnage product of claim 8, wherein the shaft includes a first end connected to the bracket and a free end.

12. The dunnage product of claim 8, wherein the flexible member includes a body and a loop encircling the shaft.

13. The dunnage product of claim 8, wherein the flexible member includes nylon rope.

14. The dunnage product of claim 8, wherein the flexible member includes a strap having a length, a width, and a thickness, the width of the strap being greater than the thickness.

15. The dunnage product of claim 8, wherein the dunnage product is reusable.

16. The dunnage product of claim 8, further including a plurality of flexible members.

17. The dunnage product of claim 8, wherein the flexible member includes a free end.

18. A dunnage product, including:
   a bracket,
   a shaft having a longitudinal axis, the shaft connected to the bracket,
   a retainer connected to the shaft, and
   an elongated flexible member having a first end retained on the shaft and movable along the longitudinal axis of the shaft, the flexible member including a strap having a length, a width, and a thickness, the width of the strap being greater than the thickness.

19. The dunnage product of claim 18, wherein the bracket is configured to be removably engaged with the wall of a shipping container.

20. The dunnage product of claim 18, wherein the dunnage product further includes a clamp for securing the dunnage product to the shipping container.

21. The dunnage product of claim 18, wherein the retainer is removable.

22. The dunnage product of claim 18, wherein the shaft includes a first end connected to the bracket and a free end.

23. The dunnage product of claim 18, wherein the shaft extends downwardly from the bracket when the dunnage product is engaged with the wall of the shipping container.

24. The dunnage product of claim 18, wherein the flexible member includes a body and a loop encircling the shaft.

25. The dunnage product of claim 18, wherein the flexible member includes nylon rope.

26. The dunnage product of claim 18, wherein the dunnage product is reusable.

27. The dunnage product of claim 18, further including a plurality of flexible members.

28. The dunnage product of claim 18, wherein the flexible member includes a free end.

* * * * *